April 22, 1969 J. A. BAKAN ET AL 3,440,106

BATTERY FORMING DEVICE

Filed July 20, 1966

INVENTORS
JOSEPH A. BAKAN &
VICTOR A. CRAINICH, JR

BY

THEIR ATTORNEYS

United States Patent Office 3,440,106
Patented Apr. 22, 1969

3,440,106
BATTERY FORMING DEVICE
Joseph A. Bakan and Victor A. Crainich, Jr., Dayton, Ohio, assignors to The National Cash Register Company, Dayton, Ohio, a corporation of Maryland
Filed July 20, 1966, Ser. No. 566,668
Int. Cl. H01m 43/06
U.S. Cl. 136—114                6 Claims

ABSTRACT OF THE DISCLOSURE

This disclosure is directed to electrode cell units having at least one pair of metal plates of different metals with a fixed porous web positioned between said plates and stationary with respect to one of the plates, said web including an encapsulated liquid electrolyte. The plates are arranged with means to advance one toward the other to form a battery upon contact with the liquid electrolyte when released from the capsules.

---

Figure 1:
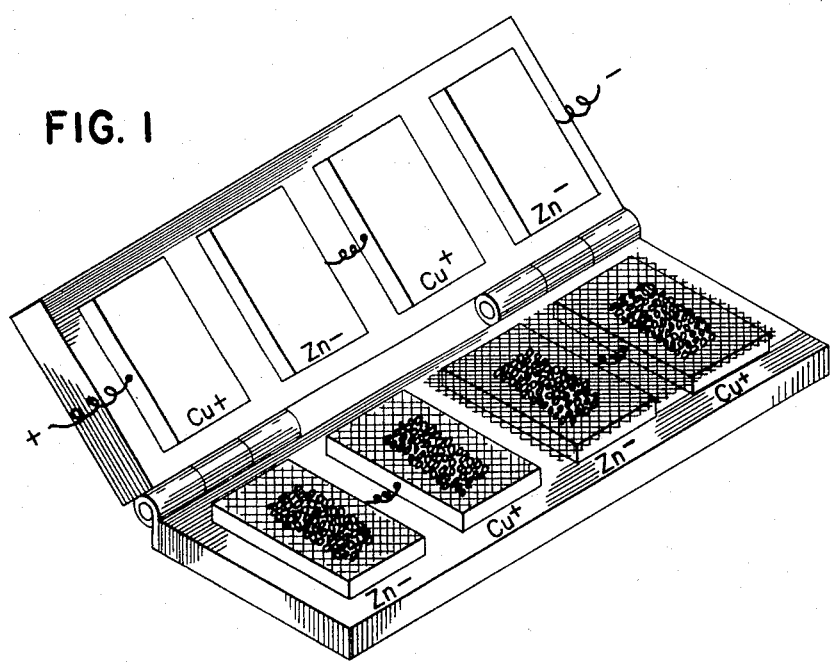

This invention relates to a device for manufacturing electrical energy by rupture of a capsule or a plurality of capsules containing electrolyte solution between electrode plates, thereby forming an electric battery. The activation of the battery is effected by movement of electrode plate members so that a discrete quantity of electrolyte is released by the rupture of a capsule, or capsules, containing electrolyte solution. The detritus of the ruptured capsule wall is so minute as not to be a deterrent factor in the functioning of the cell.

The principal object of this invention is to manufacture electric energy at will by the release of droplets of liquid electrolyte between plates of electrode metal as the plates are squeezed together, whereby an electric cell is formed forthwith in situ.

A further object of this invention is to provide a potential source of electric energy which is capable of an indefinite storage life.

The basic requirements of a primary electric cell are: (a) a relatively base-metal anode which is reasonably stable in moist air and which shows no tendency to or can be prevented from passivation in the cell; (b) an aqueous highly conducting electrolyte which does not spontaneously dissolve the metal of the anode at any significant rate with the cell on open circuit; and (c) a relatively noble-metal cathode.

A cell from which no load is taken deteriorates during storage, as is shown by the progressive fall in open circuit voltage which may take place over a period of several years. The period during which it is economical to store dry cells is known as the "shelf life." The two main factors limiting the "shelf-life" of a cell are the drying-out of the electrolyte and the corrosion of the electrodes. Both of these two main limitations are eliminated by the use of an encapsulated electrolyte. The drying-out of the electrolyte is prevented by its encapsulation, and the corrosion of the anode is likewise prevented, since the anode is not in contact with the electrolyte or with the cathode while the battery is passive; i.e., while the capsule, or capsules, remain in inert, uncrushed, state.

Although aqueous liquid sodium hydroxide solutions are the preferred electrolytes in the instant invention, the encapsulated electrolyte is not limited to sodium hydroxide solutions, but can be any substance which either in the molten state or in solution conducts electricity by transfer of ions. Those substances include, but are not limited to, sodium chloride; hydrochloric, sulfuric, hydrobromic, and nitric acids; and potassium, quaternary ammonium, calcium, and barium hydroxides.

The capsules, either individually or in a dispersion, can be coated directly onto a porous web, the individual capsules maintaining their integrity, and each having within it the electrolyte, as described. The capsules are preferably dispersed in the interstitial spaces of a porous supporting web and can be bound to or within it with a binder such as gelatin or starch. The presence of a supporting web, however, is not necessary for the practice of this invention. The detritus of the crushed capsule walls will prevent the physical contact of the electrode plates and will maintain the electrolyte. The capsule wall material is an electrically non-conducting material.

The supporting web, if present, can be any porous material which is so deformable that the capsules in its interspaces will be ruptured by the advancing electrode plate, or plates, and so rigid that the physical contact of the electrode plates is prevented. The web should also sufficiently absorb or adsorb the electrolyte solution to hold it in place as an ion transfer medium. Among materials that can be used as a supporting web are paper toweling, silk screen, nylon screen, and other porous materials.

The droplets of electrolyte can be encapsulated in any of the standard methods of coating droplets, such as those set forth in United States Patents Nos. 2,800,457, which issued on July 23, 1957, on the application of Barrett K. Green and Lowell Schleicher, and 2,800,458, which issued on July 23, 1957, on the application of Barrett K. Green and was reissued as Re. 24,899 on Nov. 29, 1960.

A broad class of capsule wall materials is encompassed within the scope of this invention. Among the coating materials are included waxes, artificial rubbers, mixtures of waxes and artificial rubbers, polypropylene, and vinyl acetate-polyethylene copolymers. While any method of encapsulation is envisaged, one of the preferred methods of coating electrolyte droplets is set forth below; viz., that of forming the interfacial polymerization product of a toluene diisocyanate-terminated polyglycol urethane prepolymer and ethylene diamine.

EXAMPLE I

In making the capsules, a liquid electrolyte solution was prepared by mixing in a vessel 150 milliliters of a 30% by weight solution of sodium hydroxide in water with 1% by weight of ethylenediamine. Next, an emulsifying solution of 300 milliliters of toluene and 250 milliliters of dichloro bisphenol, which was immiscible with the mentioned urethane prepolymer, the sodium hydroxide solution, and the ethylene diamine, was prepared.

The previously prepared sodium hydroxide solution was stirred into the dichloro bisphenol and toluene continuous phase until a dispersed phase of the sodium hydroxide-ethylenediamine solution was formed. The drop size of the sodium hydroxide solution was of the order of 500 microns to 2,000 microns.

Next, 150 milliliters of a solution of 50% by weight of a toluene diisocyanate-terminated, polyglycol urethane prepolymer having a molecular weight of the order of $1.02 \times 10^3$ (sold as Adiprene L–100 by E. I. du Pont de Nemours and Company, Wilmington, Del., United States of America) was prepared and stirred into the dispersion of the droplets.

The urethane prepolymer polymerized presumably in oriented fashion at the interface around each of the sodium hydroxide solution droplets.

The entire system was agitated during the chemical polymerization reaction between the ethylenediamine and the toluene diisocyanate-terminated polyglycol urethane prepolymer at the interface between the electrolyte solution droplets and the prepolymer. The relative amounts of materials in the phases are not critical, provided that there is sufficient dispersion of the electrolyte-ethylene diamine droplets to allow interfacial polymerization of the urethane prepolymer to proceed to form a complete seamless shell around each droplet. The interfacial reaction is self-limiting to a capsule wall thickness of 50 to 100 microns by the decreased diffusion of materials through the polyurea (polymer) film as the reaction proceeds. The capsules employed in accordance with this invention are seamless, spherical capsules formed of non-conductor polymeric material and can have capsule diameters ranging from approximately 500 microns to approximately 1500 microns.

When the capsules settled in the vessel, the continuous phase was decanted. The capsules were washed several times with 600 milliliters of a 1% solution of 1-hydroxy-ethyl-2-heptodecenyl glyoxalidine (Union Carbide Amine 220, as sold by Union Carbide Corporation, New York, N.Y., United States of America) in toluene to prevent aggregation of the capsules. In the third washing step, approximately 100 milliliters of a diatomaceous earth dispersion was added as a further deterrent to agglomeration.

The capsules, which were complete at this time, were coated upon a porous silk screen substrate in a gelatin binder, so that the capsules were supported in the interstices of the substrate and bound to the strands of the silk material.

FIG. 1 of the drawings shows a structure illustrating the embodiment of the invention utilizing hinged mounting members.

Figure 2:
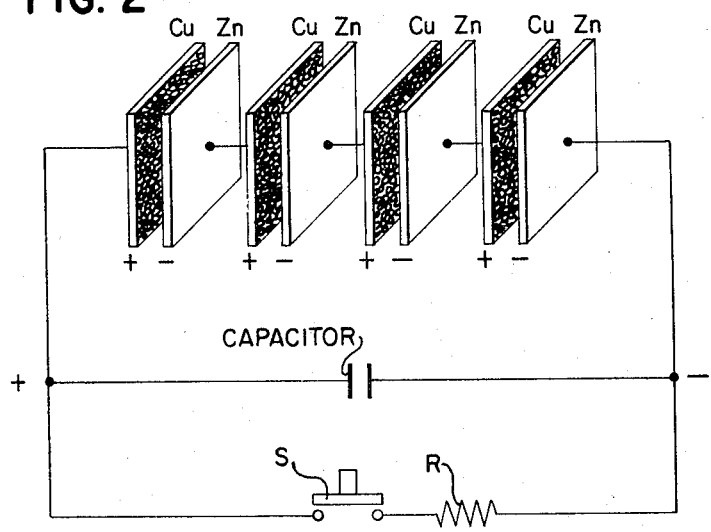

FIG. 2 is a circuit diagram showing a typical use for the device which is the subject of this invention.

A testing of the invention was performed with an apparatus similar to the one illustrated in FIGS. 1 and 2. The battery shown in FIG. 1 has four pairs of metal electrode plates, each pair comprising a negative-acting plate and a positive-acting plate, each plate being one inch square and three sixteenths of an inch thick. The instant invention is not limited to such structural limitations. One pair of electrode plates or a plurality of pairs of electrode plates is equally operable arranged for series and/or parallel circuitry for consecutive or simultaneous use. The electrode structure can be either hand-held or of a larger scale.

The load circuit illustrated in FIG. 2, as an example of the utility of this invention, contains a capacitor connected in parallel with an open resistance leg. The capacitor is to aid in storing potential and is not a necessary element in the practice of the invention. The resistance represents the load used to illustrate the device. The load circuit itself can be connected in series with the battery by the switch S.

The means for mounting the pairs of electrode plates can be any arrangement so that one plate of each pair can be advanced toward the other plate of the pair in such a way that the capsules containing electrolyte solution will be ruptured. FIG. 1 shows a hinged mounting whereby either plate or both plates of each pair can be advanced toward the other plate of the pair. This showing is not meant to exclude mountings by which the plates rupture the capsules by a sliding, screwing, or other advancing movement.

In the apparatus of FIG. 1, four pairs of zinc-copper electrodes were used and were electrically connected in series, as shown in FIG. 2, terminating in a positive terminal and a negative terminal, so designated. Between the two terminals were a capacitor circuit and a load circuit including a normally open switch and a resistance R. A capsule-impregnated fibrous web was placed between each of the electrodes composing an electrode pair. The electrodes were advanced to compress the fibrous strip to rupture the capsules, and to release the electrolyte solution, which permeated the fibrous absorbent web with sodium hydroxide solution.

A 4.4-volt potential was developed in this particular circuit when the solution was released, charging the capacitor. The switch to the resistors, when closed, created a current through the resistor, setting off a flash bulb (not shown).

The capacitor, as previously noted, is not a necessary part of the circuit, but aids in the development of electric potential.

The electromotive force developed between the electrodes is a function of the metals used for electrodes. Many commercial cells have zinc as the anode, the initial reaction being the formation of zinc ions. In the instant invention, zinc is preferred as an anode, but metals such as cadmium will also serve as anodes.

Materials preferred in cathode plates include carbon, nickel, and the preferred copper.

Various combinations of metals as electrode pairs were tested to determine the terminal potential generated. The terminal potentials developed between some metals tested were:

| Electrodes | | Terminal Potential (volts) |
| --- | --- | --- |
| Anodes | Cathodes | |
| Zinc | Carbon | 1.2 |
| Zinc | Nickel | 0.9 |
| Cadmium | Nickel | 0.9 |
| Zinc | Copper | 1.1 |

Since the pairs of electrodes function individually, the pairs may differ as to what metals are used.

While only mechanical means of rupturing the capsule, or capsules, containing the electrolyte have been shown, it is obvious that the capsules can be ruptured by other means, as by dissolving the capsule walls, by piercing the capsule walls, and by temperature elevation.

What is claimed is:

1. A passive, inert electrode cell unit capable of activation in situ, comprising at least one pair of movable electrode plates or different metals arranged with means to advance one electrode plate toward the other to form an electric battery upon contact with liquid electrolyte; a fixed, porous web positioned stationary with respect to one of said plates and between said pair of plates, said web including a plurality of seamless, spherical, rupturable, non-conductor, liquid electrolyte-containing, polymeric capsules having diameters ranging from approximately 500 microns to approximately 1500 microns and cell wall thicknesses ranging from 50 to 100 microns, said cell forming an electric battery upon release of said liquid electrolyte from said capsules.

2. A cell unit as is claim 1 wherein one of said electrode plates of said pair is zinc and the other is copper, and the liquid electrolyte is an aqueous solution of sodium hydroxide.

3. A cell unit as in claim 1 wherein said electrode plates of said pair are arranged to advance one toward the other to rupture said capsules by exertion of pressure thereon.

4. A cell unit as in claim 1 wherein said capsule cell walls are comprised of the condensation product of a toluene diisocyanate-terminated polyglycol urethane prepolymer and ethylene diamine.

5. A cell unit as in claim 1 which includes load circuit means connected in series with said battery, said load means including a capacitor in parallel circuit arrangement with a normally open resistance leg.

6. A passive, inert electrode cell unit capable of activation in situ, comprising at least one pair of movable electrode plates of which one is zinc and the other is copper arranged with means to advance one toward the other to form an electric battery upon contact with liquid electrolyte; a fixed, porous, fibrous web positioned stationary with respect to one of said plates and between said pair of plates, said web including a plurality of seamless, spherical, pressure-rupturable capsules having diameters ranging from approximately 500 microns to approximately 1500 microns and cell walls comprised of the condensation product of a toluene diisocyanate-terminated polyglycol urethane prepolymer and ethylene diamine with cell wall thicknesses ranging from 50 to 100 microns and said capsules containing an aqueous solution of sodium hydroxide electrolyte, said cell forming an electric battery upon release of said electrolyte due to the advancement of said plates causing pressure rupture of said capsules.

References Cited

UNITED STATES PATENTS

| 3,260,620 | 7/1966 | Gruber | 136—6 |
| 3,293,080 | 12/1966 | Gruber et al. | 136—90 |
| 3,304,202 | 2/1967 | Sam | 136—114 |

A. B. CURTIS, *Primary Examiner.*

C. F. LeFEVOUR, *Assistant Examiner.*

U.S. Cl. X.R.

136—90